(12) United States Patent
Huang et al.

(10) Patent No.: US 10,061,708 B2
(45) Date of Patent: Aug. 28, 2018

(54) MAPPED REGION TABLE

(71) Applicant: SK Hynix Inc., Gyeonggi-do (KR)

(72) Inventors: Szutao Huang, Pleasanton, CA (US); Chris Lin, San Jose, CA (US)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/390,264

(22) Filed: Dec. 23, 2016

(65) Prior Publication Data

US 2017/0329716 A1 Nov. 16, 2017

Related U.S. Application Data

(60) Provisional application No. 62/335,313, filed on May 12, 2016.

(51) Int. Cl.

| | |
|---|---|
| *G06F 12/00* | (2006.01) |
| *G06F 13/00* | (2006.01) |
| *G06F 12/10* | (2016.01) |
| *G06F 3/06* | (2006.01) |

(52) U.S. Cl.
CPC .......... *G06F 12/10* (2013.01); *G06F 3/0619* (2013.01); *G06F 3/0632* (2013.01); *G06F 3/0644* (2013.01); *G06F 3/0685* (2013.01); *G06F 2212/65* (2013.01)

(58) Field of Classification Search
CPC ...... G06F 12/10; G06F 3/0619; G06F 3/0632; G06F 3/0644; G06F 3/0684
USPC ............... 711/105, 103, 154, 156, 202, 221; 365/185.33
See application file for complete search history.

(56) References Cited

U.S. PATENT DOCUMENTS

| | | | |
|---|---|---|---|
| 8,572,310 B2* | 10/2013 | Oh | G06F 3/061 |
| | | | 711/103 |
| 9,778,863 B2* | 10/2017 | Agarwal | G06F 3/0619 |
| 2008/0281777 A1* | 11/2008 | Sannbotin | G06F 11/0763 |
| 2013/0091322 A1* | 4/2013 | Wang | G06F 12/0246 |
| | | | 711/103 |
| 2013/0132650 A1 | 5/2013 | Choi et al. | |
| 2013/0151754 A1 | 6/2013 | Post et al. | |
| 2014/0047210 A1 | 2/2014 | Cohen et al. | |
| 2014/0059279 A1 | 2/2014 | He et al. | |
| 2014/0164730 A1 | 6/2014 | Gold et al. | |
| 2015/0012689 A1 | 1/2015 | Atkinsson et al. | |

(Continued)

*Primary Examiner* — Sean D Rossiter
(74) *Attorney, Agent, or Firm* — Kilpatrick Townsend & Stockton LLP

(57) ABSTRACT

Techniques and systems for first determining if a non-volatile memory configured to store physical data pages is being initialized, and a volatile memory configured to store (a) plurality of physical data page addresses, each physical data page address corresponding to a physical data page and accessed via a corresponding logical address (b) first bitmap including plurality of first set of bits with each bit configured to indicate a validity state of a different first plurality of logical addresses, and (c) a second bitmap including a plurality of second set of bits, each bit in second set of bits configured to indicate a validity state of (i) different second plurality of logical addresses, and (ii) different first set of bits in first bitmap; accessing second bitmap based on first determining; and second determining of invalid state of at least one of selected logical address(es) based on a bit in second bitmap.

21 Claims, 7 Drawing Sheets

(56) References Cited

U.S. PATENT DOCUMENTS

2015/0088822 A1\* 3/2015 Raja .................. G06F 17/30324
  707/625
2017/0322728 A1\* 11/2017 Huang .................... G06F 3/061
2018/0032440 A1\* 2/2018 Iyer ....................... G06F 12/023

\* cited by examiner

MAPPED REGION TABLE

CROSS-REFERENCE TO RELATED APPLICATIONS

The present application claims priority to Provisional Application No. 62/335,313 entitled "Mapped Count Table," filed May 12, 2016, which is assigned to the assignee hereof and expressly incorporated by reference herein in its entirety.

FIELD

The present invention relates generally to systems, methods and apparatus for storage devices, and specifically to improving performance of non-volatile memory devices.

BACKGROUND

Non-volatile memory devices such as Solid State Drives (SSDs) are finding new applications in consumer electronics. For example, they are replacing Hard Disk Drives (HDDs), which typically comprise rapidly rotating disks (platters). Non-volatile memories, sometimes referred to as 'flash memories' (for example, NAND and NOR flash devices), are used in media storage, cameras, mobile phones, mobile computers, laptop computers, USB flash drives, etc. Non-volatile memory provides a relatively reliable, compact, cost-effective, and easily accessible method of storing data when the power is off.

Non-volatile memory controllers, such as flash memory controllers, are used to manage the data stored in the non-volatile memory, and to act as an interface between a host and the non-volatile memory. A flash memory controller can include a Flash Translation Layer (FTL) that maps the host side logical addresses such as "logical block addresses" (LBAs) to the flash memory side "physical addresses" which correspond to physical locations. A mapping between the logical addresses and the physical addresses can change during operating of the system for various reasons including flash management.

During operation, a host system may request deletion of certain data stored on the non-volatile memory. Such deletion requests may result in invalidation commands from the host system to the non-volatile storage device for specific LBAs. These invalidation commands are intended to mark the data stored at these LBAs as invalid, or "Trim". However, in practice, the data corresponding to that LBA may not be physically erased—the LBA, or a Bitmap table corresponding to the LBA, may be simply marked as invalid. If the data in the physical address corresponding to the invalid LBA or its Bitmap table is subsequently read, it can contain data previously present. Returning previously erased data can be undesirable, or may not meet specifications because it may pose a security threat in a number of situations.

A traditional Trim Bitmap typically resides in volatile memory, such as Dynamic Radom Accessible Memory (DRAM), and uses 1 bit per each LBA, with the Trim Bitmap size growing in direct proportion to the SSD capacity. When the Trim Bitmap size grows, it may not be possible to save the entire Trim Bitmap to non-volatile memory (e.g. NAND) during sudden power loss (SPL). As a result, it increases the difficulty for rebuilding process to maintain the accuracy of the Trim Bitmap after power loss. It also increases the processing overheads of Trim Bitmap journaling. Exemplary embodiments of the disclosure address these problems, both individually and collectively.

SUMMARY

Certain embodiments are described for a mapped region table. An exemplary embodiment includes a first determining, by a controller coupled to a non-volatile memory and a volatile memory, if the non-volatile memory is being initialized, the non-volatile memory configured to store a set of physical data pages, the volatile memory configured to store (a) a plurality of physical data page addresses, wherein each physical data page address corresponding to a physical data page in the set of physical data pages, and each physical data page address is accessed via a corresponding logical address in a set of logical addresses, (b) a first bitmap including a plurality of first set of bits, each bit in the first set of bits configured to indicate a validity state of a different first plurality of logical addresses in the set of logical addresses, and (c) a second bitmap including a plurality of second set of bits, each bit in the second set of bits configured to indicate a validity state of a (i) different second plurality of logical addresses in the set of logical addresses, and (ii) different first set of bits in the first bitmap; accessing, by the controller based on the first determining, the second bitmap; and a second determining, by the controller, an invalid state of at least one of a selected (a) logical address, or (b) plurality of logical addresses, based on a bit in the second bitmap.

Another exemplary embodiment includes accessing, by a controller, a non-volatile memory and a volatile memory coupled to the controller; the non-volatile memory configured to store a set of physical data pages; the volatile memory configured to store (a) a plurality of physical data page addresses, wherein each physical data page address corresponding to a physical data page in the set of physical data pages, and each physical data page address is accessed via a corresponding logical address in a set of logical addresses; (b) a first bitmap including a plurality of first set of bits, each bit in the first set of bits configured to indicate a validity state of a different first plurality of logical addresses in the set of logical addresses; and (c) a second bitmap including a plurality of second set of bits, each bit in the second set of bits configured to indicate a validity state of a (i) different second plurality of logical addresses in the set of logical addresses, and (ii) different first set of bits in the first bitmap; a first determining, by the controller, a validity state of a bit in the second set of bits in the second bitmap; a second determining, by the controller based on the first determining, an invalid state of the bits in the first set of bits in the first bitmap corresponding to the bit in the second set of bits in the second bitmap; and modifying, by the controller, the validity state of the bit in the second set of bits based on the second determining.

Another exemplary embodiment includes an apparatus having a non-volatile memory configured to store a set of physical data pages; a volatile memory configured to store (a) a plurality of physical data page addresses, wherein each physical data page address corresponding to a physical data page in the set of physical data pages, and each physical data page address is accessed via a corresponding logical address in a set of logical addresses, (b) a first bitmap including a plurality of first set of bits, each bit in the first set of bits configured to indicate a validity state of a different first plurality of logical addresses in the set of logical addresses, and (c) a second bitmap including a plurality of second set of bits, each bit in the second set of bits configured to indicate a validity state of a (i) different second plurality of logical addresses in the set of logical addresses, and (ii) different first set of bits in the first bitmap; and a controller coupled to the volatile memory and the non-volatile memory and configured to determine an invalid state of at least one of a selected (a) logical address, or (b) plurality of logical addresses, based on a bit in the second bitmap.

Another exemplary embodiment includes a computer readable medium having stored thereon instructions that when executed by a processor perform a method, including a first determining, by a controller coupled to a non-volatile memory and a volatile memory, if the non-volatile memory is being initialized, the non-volatile memory configured to store a set of physical data pages, the volatile memory configured to store (a) a plurality of physical data page addresses, wherein each physical data page address corresponding to a physical data page in the set of physical data pages, and each physical data page address is accessed via a corresponding logical address in a set of logical addresses, (b) a first bitmap including a plurality of first set of bits, each bit in the first set of bits configured to indicate a validity state of a different first plurality of logical addresses in the set of logical addresses, and (c) a second bitmap including a plurality of second set of bits, each bit in the second set of bits configured to indicate a validity state of a (i) different second plurality of logical addresses in the set of logical addresses, and (ii) different first set of bits in the first bitmap; accessing, by the controller based on the first determining, the second bitmap; and a second determining, by the controller, an invalid state of at least one of a selected (a) logical address, or (b) plurality of logical addresses, based on a bit in the second bitmap.

Another exemplary embodiment includes a computer readable medium having stored thereon instructions that when executed by a processor perform a method, including accessing, by a controller, a non-volatile memory and a volatile memory coupled to the controller; the non-volatile memory configured to store a set of physical data pages; the volatile memory configured to store (a) a plurality of physical data page addresses, wherein each physical data page address corresponding to a physical data page in the set of physical data pages, and each physical data page address is accessed via a corresponding logical address in a set of logical addresses; (b) a first bitmap including a plurality of first set of bits, each bit in the first set of bits configured to indicate a validity state of a different first plurality of logical addresses in the set of logical addresses; and (c) a second bitmap including a plurality of second set of bits, each bit in the second set of bits configured to indicate a validity state of a (i) different second plurality of logical addresses in the set of logical addresses, and (ii) different first set of bits in the first bitmap; a first determining, by the controller, a validity state of a bit in the second set of bits in the second bitmap; a second determining, by the controller based on the first determining, an invalid state of the bits in the first set of bits in the first bitmap corresponding to the bit in the second set of bits in the second bitmap; and modifying, by the controller, the validity state of the bit in the second set of bits based on the second determining.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1:
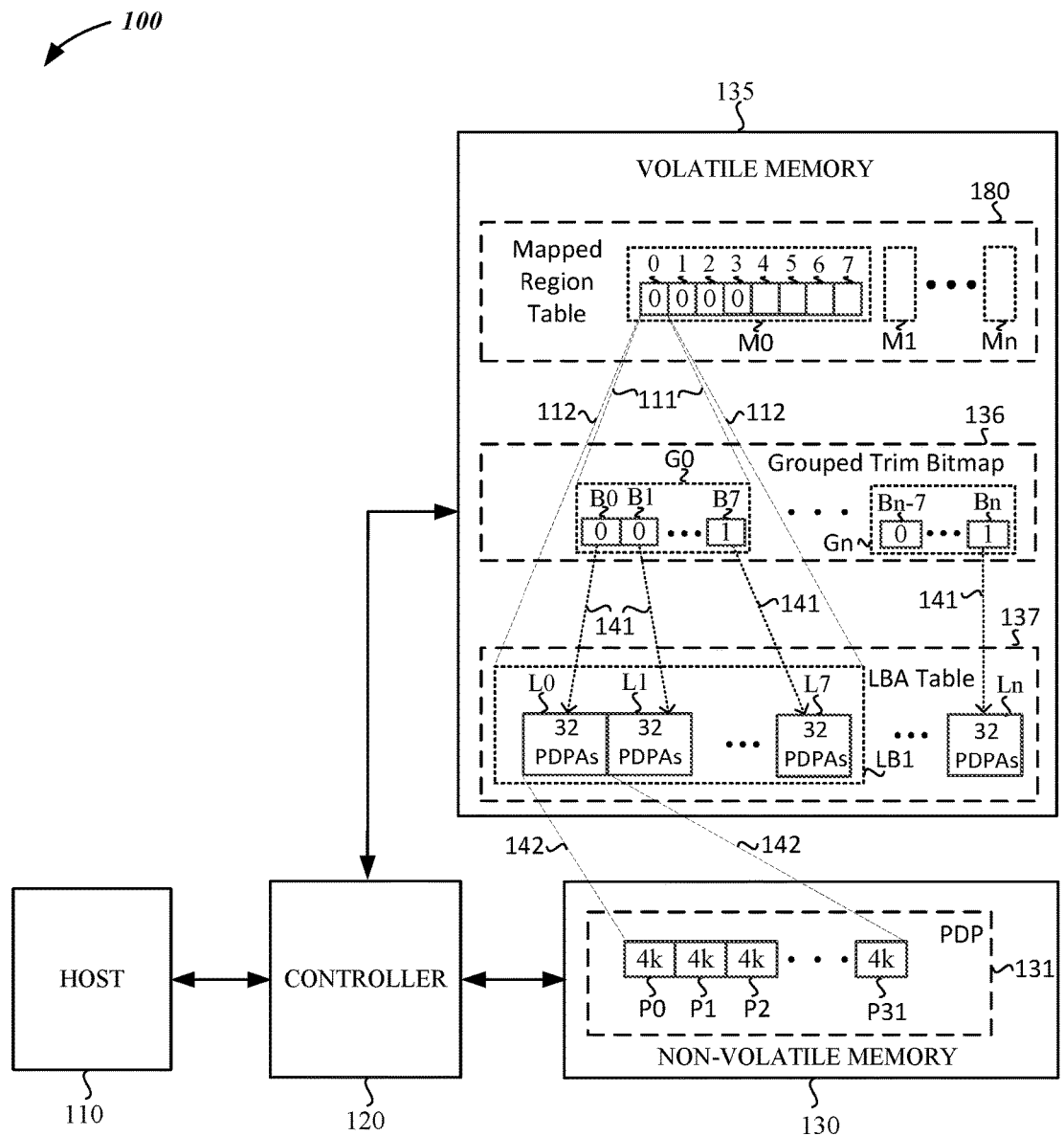
FIG. 1 is a block diagram illustrating a system including a host, a controller, a volatile memory, and a non-volatile memory according to exemplary embodiments.

Certain aspects and embodiments of this disclosure are provided below. Some of these aspects and embodiments may be applied independently, or in combination, as would be apparent to those of skill in the art. In the following description, for the purposes of explanation, specific details are set forth in order to provide a thorough understanding of embodiments. However, it will be apparent that various embodiments may be practiced without these specific details. The figures and description are not intended to be restrictive.

The ensuing description provides examples, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a functional return to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. The terms "machine-readable medium" and "computer-readable medium," as used herein, refer to any medium that participates in providing data that causes a machine to operate in a specific fashion. While illustrative embodiments of the application have been described in detail herein, it is to be understood that the inventive concepts may be otherwise variously embodied and employed, and that the appended claims are intended to be construed to include such variations, except as limited by the prior art.

Furthermore, embodiments may be implemented by hardware, software, firmware, middleware, microcode, hardware description languages, or any combination thereof. When implemented in software, firmware, middleware, microcode, the program code or code segments to perform the necessary tasks (e.g., a computer-program product) may be stored in a computer-readable or machine-readable medium. A processor(s) may perform the necessary tasks.

The following detailed description together with the accompanying drawings in which the same reference numerals are sometimes used in multiple figures to designate similar or identical structures structural elements, provide a better understanding of the nature and advantages of the present invention.

FIG. 1 is a simplified block diagram illustrating a system 100 in which exemplary embodiments of the disclosure may be implemented. As shown, system 100 includes a host 110, a controller 120, volatile memory 135, such as Dynamic Random Access Memory (DRAM), and non-volatile memory 130, such as NAND flash memory or NOR flash memory configured to interact externally as a NAND flash memory. In embodiments, non-volatile memory 130 can be designed to store data in the absence of a continuous or substantially continuous external power supply. In some examples, non-volatile memory 130 can be used for secondary data storage, for example, in a computer system such as a laptop. In such examples, a non-volatile memory system 130 can replace a hard disk drive (HDD). In some examples, controller 120 can be external to non-volatile memory system 130. In some such examples, controller 120 can interact with a plurality of non-volatile memories. The architecture and organization of an example non-volatile memory 130 will be provided later in the specification. Other examples of non-volatile memory 130 can include read only memory (ROM), a mask ROM (MROM), a programmable ROM (PROM), an erasable programmable ROM (EPROM), an electrically erasable programmable ROM (EEPROM), Ferroelectric RAM (F-RAM), Magnetoresistive RAM (RAM), polymer-based organic memory, holographic memory, phase change memory and the like.

Host 110 can include any appropriate hardware device, software application, or a combination of hardware and software. In some embodiments, host 110 can include a host-side controller (not shown). In exemplary embodiments, controller 120 is coupled to and interfaces between host 110, volatile memory 135 and non-volatile memory 130.

As shown in FIG. 1, non-volatile memory 130 is configured to store a set of physical data pages (PDP), such as P0-P31, in which actual data is stored, such as in four Kilobytes sizes. Volatile memory 135 includes an LBA table 137 which includes a plurality (i.e. set) of physical data page addresses (PDPAs), such as in subsets of 32 PDPAs, wherein each PDPA plurality (i.e. each PDPA subset in the set) is accessed via a corresponding logical address (LA) or plurality of logical addresses (LAs) such as L0 or L1, in a set of logical addresses, such as L0-Ln. As described later and in greater detail in conjunction with FIGS. 2A-C, each PDPA corresponds to a PDP, such as P0, in the set of PDPs, and therefore each set of 32 PDPAs in LBA table 137 correspond to 32 PDPs in non-volatile memory 130, as shown symbolically via arrows 142 in FIG. 1.

Volatile memory 135 further includes a Grouped Trim Bitmap (GTB) 136, having a set of bits B0, B1 . . . Bn grouped into plurality of sets, such as exemplary sets G0 . . . Gn having 8 bits each. As described later and in greater detail in conjunction with FIG. 2A-C, each bit B0-Bn in GTB 136 corresponds to (shown symbolically via arrows 141) and is configured to indicate a validity state (e.g. valid or invalid) of a different first plurality of logical addresses, such as L0 or L1, in the set of logical addresses in LBA table 137.

Volatile memory 135 further includes a Mapped Region Table (MRT) 180, a bitmap having a plurality of set of bits such as exemplary sets M0, M1 . . . Mn, each having 8 bits, such as bits 0-7. As described later and in greater detail in conjunction with FIGS. 2A-C, each individual bit in MRT 180, such as bit 0 in M0, is configured to indicate a validity state of (i) a different second plurality of logical addresses, such as set LB1 having 256 bits, in the set of logical addresses in LBA table 137 (shown symbolically via arrows 112), as well as (ii) a validity state of a different set of bits in GTB 136, such as set G0 (shown symbolically via arrows 111). In an exemplary embodiment such as shown in FIG. 1 and FIGS. 2A-C, the second plurality of logical addresses, such as LB1, includes at least one set of first plurality of logical addresses, such as L0, in the LBA Table 137.

Controller 120 is coupled to and interfaces with the volatile memory 135 and the non-volatile memory 130, such as for retrieving/storing data from/to PDPs. Controller 120 is configured to determine an invalid state (i.e. unmapped or Trimmed) of at least one of a selected (a) logical address (shown later in FIGS. 2A-C), or (b) plurality of logical addresses, such as LB1, based on a bit in the MRT table 180, such as bit 0 in M0, as described later and in greater detail in conjunctions with FIGS. 2A-C. In an exemplary embodiment, controller 120 includes a flash memory controller configured to store GTB 136 and MRT 180 to non-volatile memory 130 in the event of a power-loss.

Figure 2A:
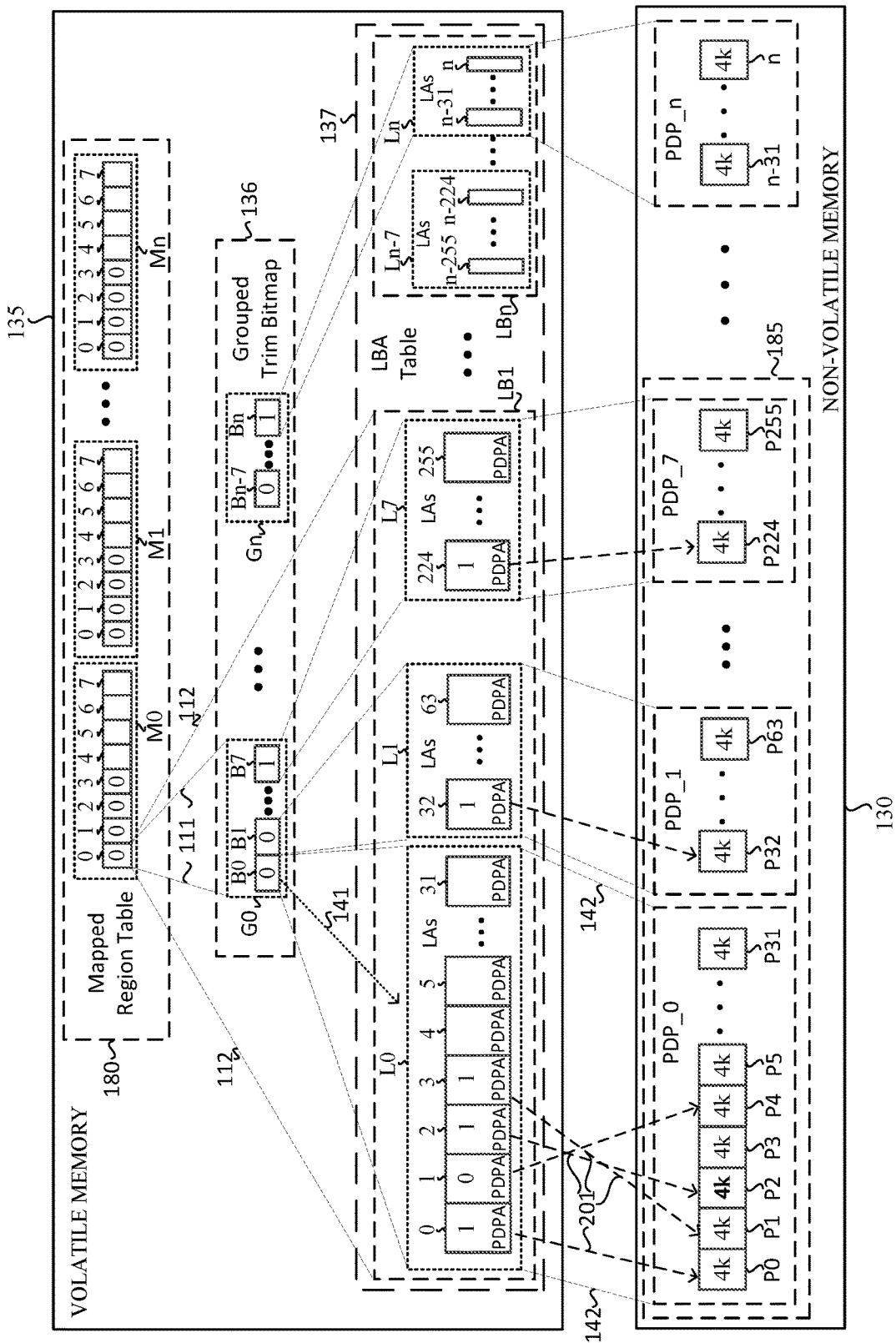
FIGS. 2A-2C illustrate memory mappings, according to exemplary embodiments.
Figure 2B:
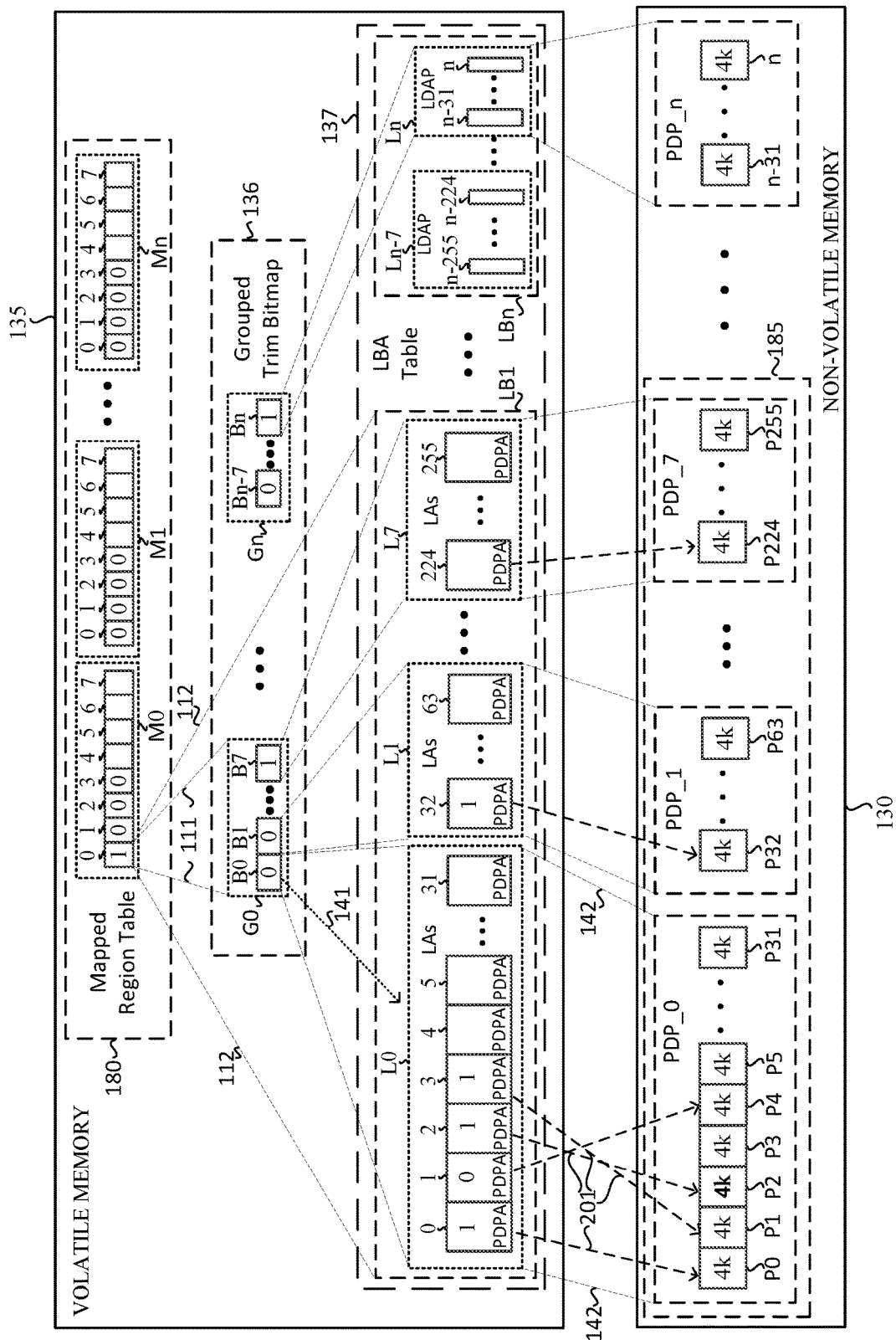
Figure 2C:
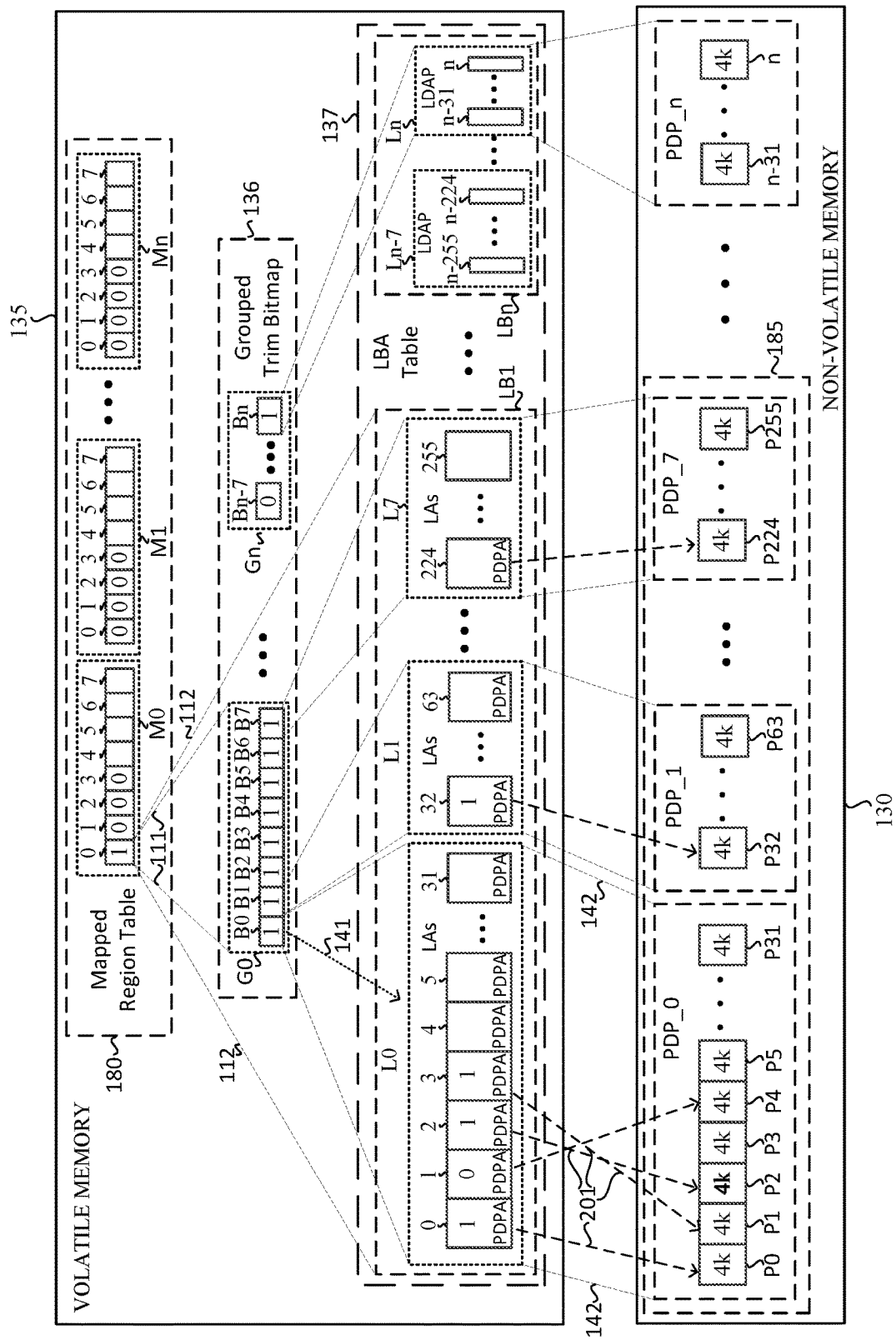

FIGS. 2A-C further illustrate memory mappings of FIG. 1, as well as other exemplary embodiments. As shown in FIGS. 2A-C, the logical addresses in LBA Table 137, such as 0 to n, are partitioned into sequentially numbered logical addresses subsets, such as L0, L1, L2 . . . Ln, each having a fixed plurality, such as 32, of sequentially numbered logical addresses, such as 0-31 for L0, 32-63 for L1, 64-95 for L2, etc. The bits in GTB 136 are also sequentially numbered bits, such as B0, B1 . . . Bn, with each bit corresponding to a logical addresses subset. For example, B0 corresponds to L0, B1 to L1, etc. As such, bits B0, B1 . . . Bn, are grouped in GTB 136 with each bit used to represent a logical addresses subset representing 32 logical addresses, such as L0, with each of 0-31 addresses in L0, such as address 0, corresponding to a PDP, such as P0, via a PDPA as symbolically shown by arrow(s) 201. In an exemplary embodiment, L0's size is configurable for each capacity. If the L0's size is set to 32 as in the shown example, then each bit B0-Bn represents an L0's having 32 contiguous grouped logical addresses, and so 1 Terabyte capacity will need only 1 Megabyte (MB) space for GTB 136, as compared to 32 MB in a traditional Trim Bitmap. Since GTB 136 size is now relatively small, a firmware doesn't need to do the Trim Bitmap journaling in background. The firmware has enough time to save the whole GTB 136 during power loss that may also help reduce the rebuild time after power up (SPOR—Sudden Power Off Recovery.)

As described in greater detail below in conjunction with FIG. 3, a value of 1 in a bit in GTB 136, such as shown in B7, indicates an invalid (i.e. Trim) state of the corresponding L7, which means actual data stored in PDPs P224-P255 corresponding to L7 are either deleted, or marked for deletion, and therefore will not be retrieved upon receipt of a request for their data. In an exemplary embodiment, random or invalid data might then be returned instead.

As shown in FIGS. 2A-C, the Mapped Region Table (MRT) 180 has sets of bits such as exemplary sets M0, M1 ... Mn, each having a number of bits, such as 8 (bits 0-7) as shown, with each bit configured to indicate a validity state of (i) a different second plurality of logical addresses, such as set LB1 or LBn having 256 bits each, in the set of logical addresses in LBA table 137 (shown symbolically via arrows 112), as well as (ii) a validity state of a different set of bits in GTB 136, such as set G0 (shown symbolically via arrows 111). In an exemplary embodiment such as shown in FIG. 1 and FIG. 2A-C, the second plurality of logical addresses, such as LB1, includes at least one set of first plurality of logical addresses, such as L0, in the LBA Table 137.

Figure 3:
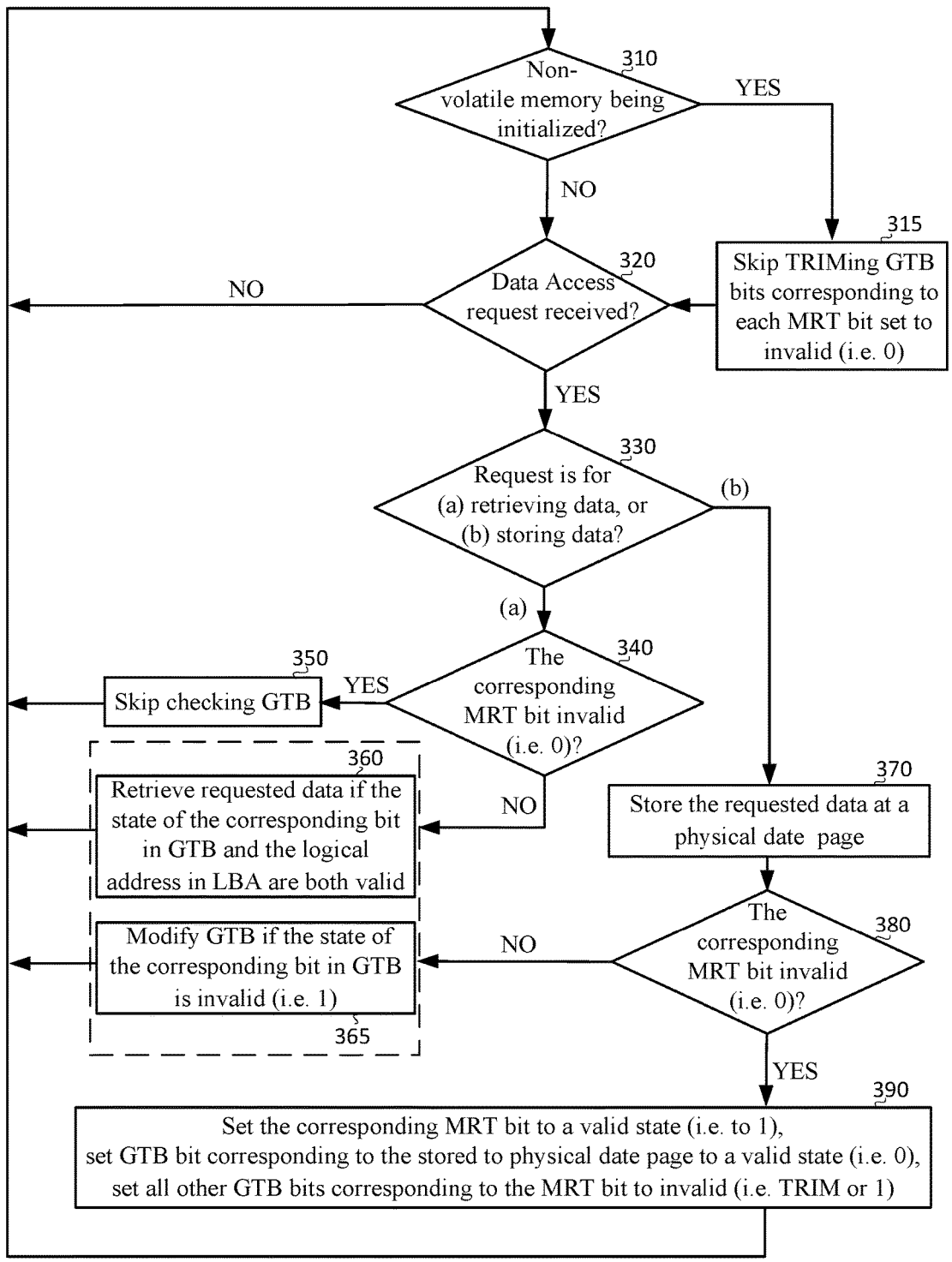
FIG. 3 and FIG. 4 are flowcharts illustrating processes performed by a controller, according to exemplary embodiments.

FIG. 3 is a flowchart that illustrates a process performed by a controller 120, according to example embodiments in FIG. 1 and FIGS. 2A-C. As shown in FIG. 3, an example process flow may begin at block 310, in which controller 120 determines if the non-volatile memory 130 is being initialized, such as for when the non-volatile memory 130 is unmapped in a Fresh Out of Box (FOB) case. In an exemplary embodiment, controller 120 either set bits in MRT 180 to invalid (i.e. 0) during initialization, or checks to see if the bits are already preset to invalid during manufacturing. In this scenario, the flow then proceeds to block 315, wherein for each bit in MRT 180 set to invalid (e.g. to 0), such as for bit 0 in set M0, controller 120 skips modifying to an invalid state (i.e. Trim) for corresponding set of bits in GTB 136, such as set of bits G0 as shown in FIG. 3.

Following initialization in block 315, or if it was determined in block 310 that non-volatile memory 130 is not being initialized (i.e. already mapped), the flow then proceeds to block 320, in which controller 120 determines if a data access request, such as for Read or Write from volatile memory 135, is received. If, in block 320, it is determined that no data access is received, the flow is then returned to block 310. If, in block 320, it is determined that a data access is received, the flow then proceeds to block 330.

Next, in decision block 330, controller 120 determines if the request in block 320 is for storing data (i.e. Write operation) or retrieving data (i.e. Read operation). In one example, in block 320 controller 120 receives a request for storing data for a Write to a requested PDP, and so the flow proceeds to block 370 wherein controller 120 stores the incoming data in the requested PDP, such as in P0. Then, in decision block 380, controller 120 determines the validity state of the corresponding bit from MRT 180, such as bit 0 in M0 that represents P0 (the PDP the data was stored to) via its corresponding logical addresses. If, the determination in block 380 is that the state of the corresponding bit from MRT 180, such as bit 0 in M0 is invalid, such as having a value of 0 as shown in FIG. 2A, then the flow proceeds to block 390.

Next, in block 390, controller 120 modifies (i.e. sets) the state of the corresponding bit from MRT 180, such as bit 0 in M0, to a valid state, such as to 1. Controller 120 then, if needed, modifies (i.e. sets) to a valid state, such as to 0, a bit in GTB 136 corresponding to the requested physical data page, such as bit B0 that corresponds to P0. If however, bit 0 was already in a valid state, such as having a value of 0, then controller 120 will then simply maintain its valid state. In addition, controller 120 modifies (i.e. sets) to an invalid state (i.e. a TRIM state represented by value 1), all other bits in the set of bits in GTB 136 that B0 corresponds to, such as setting B1-B7 in set G0 to a value 1, which represents a TRIM state for B1-B7.

In another example, if the determination in block 380 is that the state of the corresponding bit from MRT 180, such as bit 0 in M0 is valid, such as having a value of 1 as shown in FIG. 2B, then the flow proceeds to block 365, wherein the GTB 136 is modified if the state of the corresponding bit in GTB 136 is invalid, such as 1. In the example shown in FIG. 2B, the state of the corresponding bit B0 in GTB 136 is valid (since it is a 0) and therefore B0 in GTB will not be modified, such as to a 1 (i.e. TRIM) had it been invalid (i.e. 1).

In another example, in block 320 controller 120 receives a request for retrieving data for a Read from a requested PDP, such as P4 of non-volatile memory 130, and so the flow proceeds to block 340 wherein controller 120 determines the validity state of the corresponding bit from MRT 180, such as bit 0 in M0, that represents the to be read from PDP, such as P4, via its corresponding logical addresses. If the determination in block 340 is that the state of the corresponding bit from MRT 180, such as bit 0 in M0 is invalid, such as having a value of 0 as shown in FIG. 2A, then the flow proceeds to block 350 in which a validity check of the bits in GTB 136 is skipped. In an exemplary embodiment, random or invalid data might then be returned instead.

In another example, if the determination in block 340 is that the state of the corresponding bit from MRT 180, such as bit 0 in M0 is valid, such as having a value of 1 as shown in FIG. 2B, then the flow proceeds to block 360 in which requested data is retrieved if the state of the corresponding bit in GTB 136, such as B0, and the logical address in LBA, such as in bit 1 in L0, are both valid. As shown in FIG. 2B, bit B0 and bit 1 in L0 are both valid (i.e. have value 0) and therefore the requested data is retrieved from P4. If however either of bit B0 or bit 1 in L0 were invalid (i.e. have value 1), then the requested data is not returned. In an exemplary embodiment, random or invalid data might then be returned instead.

Figure 4:
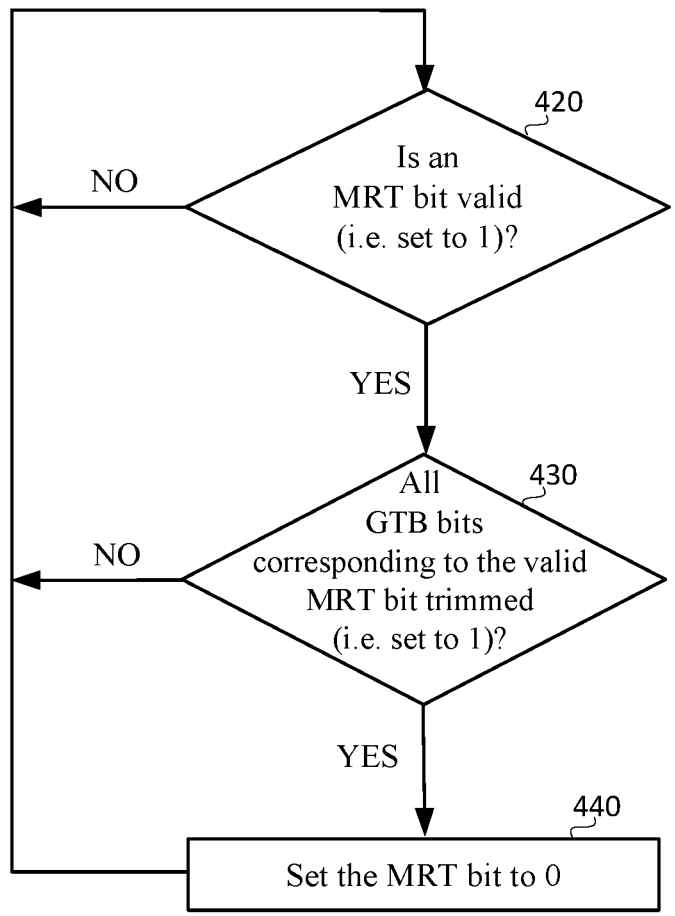

FIG. 4 is a flowchart that illustrates a process performed by a controller 120, according to example embodiments in FIG. 1 and FIGS. 2A-C. Starting in block 420, controller 120 determines a validity state of a bit in a bit set in MRT 180, such as determining if bit 0 in M0 is valid (i.e. set to 1). In an exemplary embodiment, a valid state (i.e. set to 1) represents a mapped state, and an invalid state (i.e. 0) represents an unmapped or a completely TRIMMed state, of the bit 0 in M0 in MRT 180. In one example, shown in FIG.

2A, the bit 0 in M0 is determined to be invalid (i.e. set to 0), and the flow is returned to block 420. In another example, shown in FIG. 2B, the bit 0 in M0 is determined to be valid (i.e. set to 1), and the flow then proceeds to block 430.

Next, in block 430, controller 120 determines the validity state of the bits in set of bits in GTB 136 corresponding to the bit in MRT 180, such as determining the validity state of bits, such as all the bits B0-B7, in set of bit G0 in GTB 136 which correspond to the bit 0 in M0 in MRT 180. In an exemplary embodiment, a valid state of a bit, such as B0, in GTB 136 represents a non-trimmed state (i.e. 0), and wherein an invalid state represents a trimmed state (i.e. 1) of the bit. In one example, shown in FIG. 2B, at least bits B0 and B1 are valid (i.e. set to 0) and thus it is determined that not all the bits B0-B7 in G0 are invalid (i.e. set to 1), and the flow is returned to block 420. In another example, shown in FIG. 2C, all the bits B0-B7 in G0, such as are determined to be invalid (i.e. set to 1), and the flow then proceeds to block 440 in which the valid state of bit 0 in M0 in MRT 180 which corresponds to bit set G0 is GTB 136 is modified to invalid (i.e. set to 0).

In an exemplary embodiment, the process described in FIG. 4 is triggered when a bit in GTB 136 is Trimmed (i.e. set to 1), to determine if all others bits in the bit set, such as G0, are also already set to Trimmed, and if so, to then modify the validity of bit in MRT 180 which represents the bit set in GTB 136.

Figure 5:
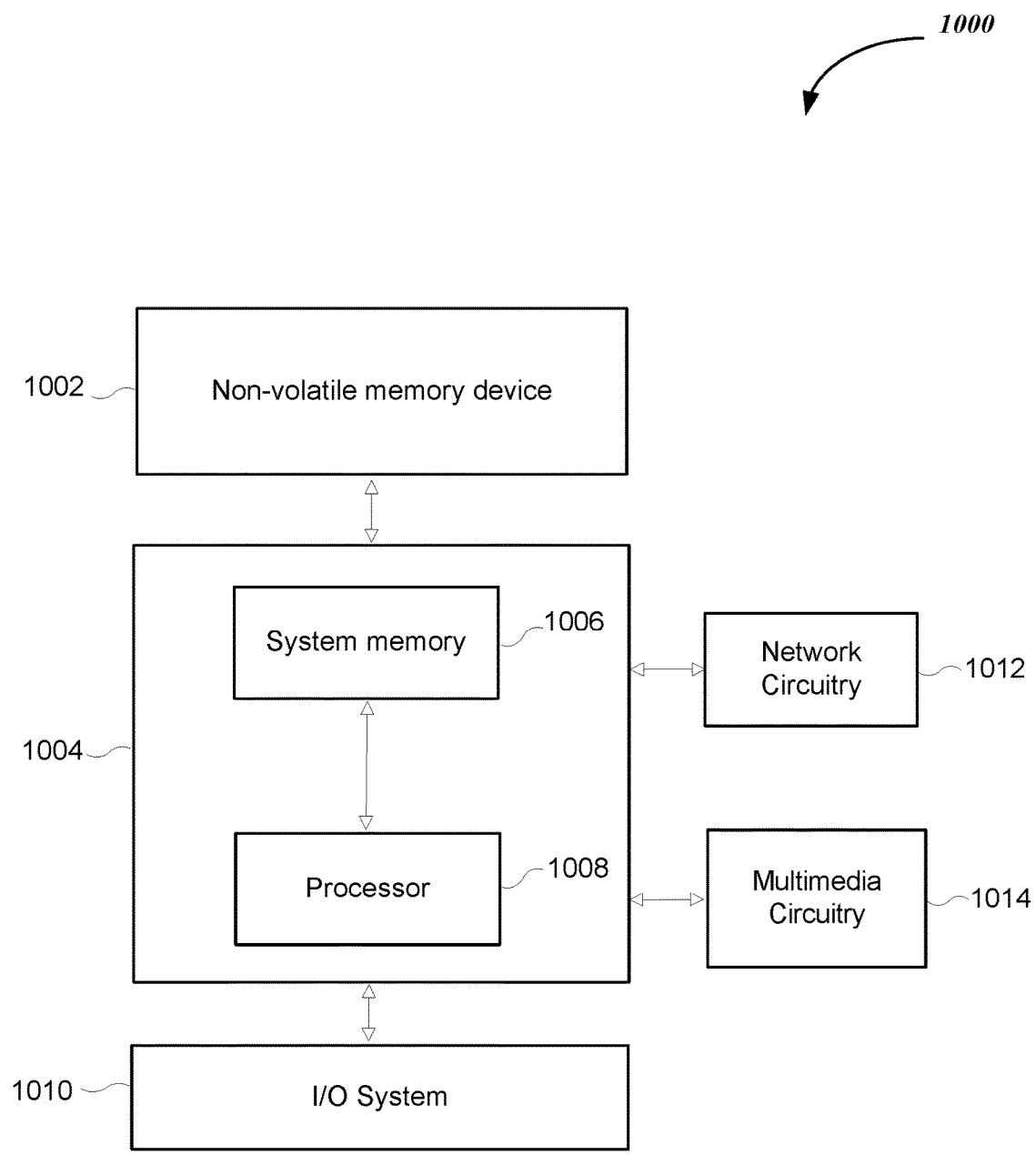
FIG. 5 is a simplified illustration of an exemplary host computer device.

FIG. 5 illustrates an example computing device 1000 comprising embodiments of the invention. Hardware elements of device 1000 can be electrically coupled via a bus (or may otherwise be in communication, as appropriate). As shown in FIG. 5, computing device 1000 includes processing unit 1004, non-volatile memory device 1002, an input/output (I/O) system 1010, network circuitry 1012, and multimedia circuitry 1014. In the example depicted, processing unit 1004 can act as a host system.

In examples, non-volatile memory device 1002 can be a NAND flash memory device and can be used to store secondary data accessed by processing unit 1004. Non-volatile memory device 1002 can include a controller 120 (shown in FIG. 1) according to embodiments described above, acting as an interface between non-volatile memory device 1002, such as the non-volatile memory 130 shown in FIG. 1 and the processing unit 1004. System memory 1006 can be a volatile memory such as a Random Access Memory (RAM) and can operate in conjunction with processor 1008. Processor 1008 can include, without limitation one or more general-purpose processors and/or one or more special-purpose processors (such as digital signal processing chips, graphics acceleration processors, and/or the like.)

Computing device 1000 can further include network circuitry 1012 to connect computing device 1000 to a network. The network circuitry can include without limitation a modem, a network card (wireless or wired), an infrared communication device, a wireless communication device and/or chipset (such as a Bluetooth™ device, an 1602.11 device, a WiFi device, a WiMax device, cellular communication facilities, etc.), and/or the like. Network circuitry 1012 may permit data to be exchanged with a network, other devices, and/or any other devices described herein.

As shown in FIG. 5, computing device 1000 can include multimedia circuitry 1014. Multimedia circuitry 1014 can connect computing device 1000 to several external audio and video input and output, such as displays and speakers. I/O system 1010 can connect computing device 1000 to various input devices and mechanisms such as keyboards, mice, touchscreens, cameras, infra-red capture devices, and the like, and output devices and mechanisms such as a printer, a display unit, a haptic feedback device, and/or the like.

Device 1000 also can comprise software elements, located within system memory 1006 or in non-volatile memory 1002, including device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device such as controller 120) to perform one or more operations in accordance with the described methods, for example the method illustrated in FIG. 3 and FIG. 4.

A set of these instructions and/or code might be stored on a computer-readable storage medium, such as the non-volatile memory device 1002, within controller 120 described above. In some cases, the storage medium might be incorporated within a device, such as device 1000 or controller 120. In other embodiments, the storage medium might be separate from a device (e.g., a removable medium, such as a compact disc), and/or provided in an installation package, such that the storage medium can be used to program, configure and/or adapt a general purpose computer with the instructions/code stored thereon. These instructions might take the form of executable code, which is executable by a device and/or might take the form of source and/or installable code, which, upon compilation and/or installation on a device (e.g., using any of a variety of generally available compilers, installation programs, compression/decompression utilities, etc.) then takes the form of executable code.

Substantial variations may be made based on specific requirements. For example, customized hardware might also be used, and/or particular elements might be implemented in hardware, software (including portable software, such as applets, etc.), or both. Further, connection to other computing devices such as network input/output devices may be employed.

It is understood that the specific order or hierarchy of steps in the processes disclosed is an illustration of exemplary approaches, and may be rearranged based upon design preferences. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes one or more computer-executable program instructions stored in memory. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A device, comprising:
   a non-volatile memory configured to store a set of physical data pages;
   a volatile memory configured to store (a) a plurality of physical data page addresses, wherein each physical data page address corresponding to a physical data page in the set of physical data pages, and each physical data page address is accessed via a corresponding logical address in a set of logical addresses, (b) a first bitmap including a plurality of first set of bits, each bit in the first set of bits configured to indicate a validity state of a different first plurality of logical addresses in the set of logical addresses, and (c) a second bitmap including a plurality of second set of bits, each bit in the second set of bits configured to indicate a validity state of a (i) different second plurality of logical addresses in the set of logical addresses, and (ii) different first set of bits in the first bitmap; and
   a controller coupled to the volatile memory and the non-volatile memory and configured to determine an invalid state of at least one of a selected (a) logical address, or (b) plurality of logical addresses, based on a bit in the second bitmap.

2. The device of claim 1, wherein the second plurality of logical addresses includes at least one set of first plurality of logical addresses.

3. The device of claim 1, wherein the controller is further configured to:
   determine if the non-volatile memory is being initialized; and
   skip, a modification to an invalid state for validity state of the bits in the plurality of first set of bit in the first bitmap, if the non-volatile memory is being initialized.

4. The device of claim 1, wherein the controller is further configured to:
   access the second bitmap based on a received data access request to store data in at least one requested physical data page;
   store the requested data to the requested physical data page; and
   determine the validity state of the bit from the second bitmap that represents a second plurality of logical addresses corresponding to the physical data page addresses for the at least one requested physical data page; and if the validity state is determined as invalid to:
     modify to a valid state, a validity state of the bit from the second bitmap that represents a second plurality of logical addresses corresponding to the physical data page addresses for the at least one requested physical data page;
     modify to a valid state, a validity state of at least one bit in the first set of bits in the first bitmap corresponding to the requested physical data page; and
     modify to an invalid state, a validity state of bits different than the first bit in the first set of bits in the first bitmap.

5. The device of claim 1, wherein the controller is further configured to:
   access the second bitmap based on a received data access request to retrieve data from at least one requested physical data page;
   determine the validity state of the bit from the second bitmap that represents a second plurality of logical addresses corresponding to the physical data page addresses for the at least one requested physical data page;
   skip a validity check of the bits in the first bitmap, if the validity state of the bit from the second bitmap is determined as invalid; and initiate a determination to retrieve the request data if the validity state of the bit from the second bitmap is determined as valid.

6. The device of claim 1, wherein the controller is further configured to:
determine a valid state of the bit in the second set of bits in the second bitmap;
determine an invalid state of the bits in the first set of bits in the first bitmap corresponding to the bit in the second set of bits in the second bitmap; and
modify the validity state of the bit in the second set of bits based on the determinations of (a) a valid state of the bit in the second set of bits in the second bitmap and (b) an invalid state of all the bits in the first set of bits in the first bitmap corresponding to the bit in the second set of bits in the second bitmap.

7. The method of claim 5, wherein a valid state of the bit in the second set of bits in the second bitmap represents a mapped state, wherein an invalid state of the bit in the second set of bits represents an unmapped state, wherein a valid state of the bit in the first set of bits in the first bitmap represents a non-trimmed state, and wherein an invalid state of the bit in the first set of bits represents a trimmed state.

8. The device of claim 1, wherein the controller is further configured to store at least one of the first bitmap or the second bitmap to non-volatile memory in the event of a power-loss.

9. The device of claim 1, wherein the set of logical addresses are partitioned into sequentially numbered subsets, wherein each subset comprising a fixed plurality of sequentially numbered logical addresses, wherein the bits in the first bitmap are sequentially numbered bits, each bit corresponding to a different fixed first plurality of sequentially numbered logical addresses, and wherein the bits in the second bitmap are sequentially numbered bits, each bit corresponding to a different fixed second plurality of sequentially numbered logical addresses.

10. The device of claim 1, wherein the non-volatile memory comprising a flash memory and wherein the controller comprising a flash memory controller.

11. A method comprising:
a first determining, by a controller coupled to a non-volatile memory and a volatile memory, if the non-volatile memory is being initialized, the non-volatile memory configured to store a set of physical data pages, the volatile memory configured to store (a) a plurality of physical data page addresses, wherein each physical data page address corresponding to a physical data page in the set of physical data pages, and each physical data page address is accessed via a corresponding logical address in a set of logical addresses, (b) a first bitmap including a plurality of first set of bits, each bit in the first set of bits configured to indicate a validity state of a different first plurality of logical addresses in the set of logical addresses, and (c) a second bitmap including a plurality of second set of bits, each bit in the second set of bits configured to indicate a validity state of a (i) different second plurality of logical addresses in the set of logical addresses, and (ii) different first set of bits in the first bitmap;
accessing, by the controller based on the first determining, the second bitmap; and
a second determining, by the controller, an invalid state of at least one of a selected (a) logical address, or (b) plurality of logical addresses, based on a bit in the second bitmap.

12. The method of claim 11, further comprising:
skipping modifying to an invalid state for validity state of the bits in the plurality of first set of bit in the first bitmap, if the non-volatile memory is being initialized.

13. The method of claim 11, wherein the accessing is further based on a received data access request for storing data in at least one requested physical data page, the method further comprising:
storing, by the controller, the requested data to the requested physical data page; and
a third determining the validity state of the bit from the second bitmap that represents a second plurality of logical addresses corresponding to the physical data page addresses for the at least one requested physical data page.

14. The method of claim 13, wherein the validity state of the bit from the second bitmap is determined an invalid, and the method further comprising:
modifying to a valid state, by the controller, a validity state of the bit from the second bitmap that represents a second plurality of logical addresses corresponding to the physical data page addresses for the at least one requested physical data page;
modifying to a valid state, by the controller, a validity state of at least one bit in the first set of bits in the first bitmap corresponding to the requested physical data page; and
modifying to an invalid state, by the controller, a validity state of bits different than the first bit in the first set of bits in the first bitmap.

15. The method of claim 11, wherein the accessing is further based on a received data access request for retrieving data from at least one requested physical data page, the method further comprising:
a third determining the validity state of the bit from the second bitmap that represents a second plurality of logical addresses corresponding to the physical data page addresses for the at least one requested physical data page;
skipping a validity check of the bits in the first bitmap, if the validity state of the bit from the second bitmap is determined as invalid; and
initiating a fourth determining for retrieving the request data if the validity state of the bit from the second bitmap is determined as valid.

16. A method comprising:
accessing, by a controller, a non-volatile memory and a volatile memory coupled to the controller; the non-volatile memory configured to store a set of physical data pages; the volatile memory configured to store (a) a plurality of physical data page addresses, wherein each physical data page address corresponding to a physical data page in the set of physical data pages, and each physical data page address is accessed via a corresponding logical address in a set of logical addresses; (b) a first bitmap including a plurality of first set of bits, each bit in the first set of bits configured to indicate a validity state of a different first plurality of logical addresses in the set of logical addresses; and (c) a second bitmap including a plurality of second set of bits, each bit in the second set of bits configured to indicate a validity state of a (i) different second plurality of logical addresses in the set of logical addresses, and (ii) different first set of bits in the first bitmap;
a first determining, by the controller, a validity state of a bit in the second set of bits in the second bitmap;

a second determining, by the controller based on the first determining, an invalid state of the bits in the first set of bits in the first bitmap corresponding to the bit in the second set of bits in the second bitmap; and modifying, by the controller, the validity state of the bit in the second set of bits based on the second determining.

17. The method of claim 16, wherein a valid state of the bit in the second set of bits in the second bitmap represents a mapped state, and wherein an invalid state of the bit in the second set of bits represents an unmapped state.

18. The method of claim 17, wherein a valid state of the bit in the first set of bits in the first bitmap represents a non-trimmed state, and wherein an invalid state of the bit in the first set of bits represents a trimmed state.

19. The method of claim 18, wherein the modifying comprises setting the bit in the second set of bit to an invalid state based on (a) the first determining of a valid state of the bit in the second set of bits in the second bitmap, and (b) the second determining of an invalid state of all the bits in the first set of bits in the first bitmap corresponding to the bit in the second set of bits in the second bitmap.

20. A non-transitory machine readable storage medium having stored thereon instructions that when executed by a processor perform a method, including:

a first determining, by a controller coupled to a non-volatile memory and a volatile memory, if the non-volatile memory is being initialized, the non-volatile memory configured to store a set of physical data pages, the volatile memory configured to store (a) a plurality of physical data page addresses, wherein each physical data page address corresponding to a physical data page in the set of physical data pages, and each physical data page address is accessed via a corresponding logical address in a set of logical addresses, (b) a first bitmap including a plurality of first set of bits, each bit in the first set of bits configured to indicate a validity state of a different first plurality of logical addresses in the set of logical addresses, and (c) a second bitmap including a plurality of second set of bits, each bit in the second set of bits configured to indicate a validity state of a (i) different second plurality of logical addresses in the set of logical addresses, and (ii) different first set of bits in the first bitmap;

accessing, by the controller based on the first determining, the second bitmap; and a second determining, by the controller, an invalid state of at least one of a selected (a) logical address, or (b) plurality of logical addresses, based on a bit in the second bitmap.

21. A non-transitory machine readable storage medium having stored thereon instructions that when executed by a processor perform a method, including:

accessing, by a controller, a non-volatile memory and a volatile memory coupled to the controller; the non-volatile memory configured to store a set of physical data pages; the volatile memory configured to store (a) a plurality of physical data page addresses, wherein each physical data page address corresponding to a physical data page in the set of physical data pages, and each physical data page address is accessed via a corresponding logical address in a set of logical addresses; (b) a first bitmap including a plurality of first set of bits, each bit in the first set of bits configured to indicate a validity state of a different first plurality of logical addresses in the set of logical addresses; and (c) a second bitmap including a plurality of second set of bits, each bit in the second set of bits configured to indicate a validity state of a (i) different second plurality of logical addresses in the set of logical addresses, and (ii) different first set of bits in the first bitmap;

a first determining, by the controller, a validity state of a bit in the second set of bits in the second bitmap;

a second determining, by the controller based on the first determining, an invalid state of the bits in the first set of bits in the first bitmap corresponding to the bit in the second set of bits in the second bitmap; and modifying, by the controller, the validity state of the bit in the second set of bits based on the second determining.

* * * * *